United States Patent
Le Pallec et al.

(10) Patent No.: US 8,964,722 B2
(45) Date of Patent: Feb. 24, 2015

(54) CLOCK FOR A NODE OF A PACKET-SWITCHED NETWORK, AND ASSOCIATED SYNCHRONISATION METHOD

(75) Inventors: Michel Le Pallec, Nozay (FR); Dinh Thai Bui, Nozay (FR)

(73) Assignee: Alcatel Lucant, Boulogne-Billancourt (FR)

( * ) Notice: Subject to any disclaimer, the term of this patent is extended or adjusted under 35 U.S.C. 154(b) by 313 days.

(21) Appl. No.: 12/998,738

(22) PCT Filed: Dec. 7, 2009

(86) PCT No.: PCT/EP2009/066485
§ 371 (c)(1),
(2), (4) Date: Jun. 28, 2011

(87) PCT Pub. No.: WO2010/066664
PCT Pub. Date: Jun. 17, 2010

(65) Prior Publication Data
US 2011/0255546 A1    Oct. 20, 2011

(30) Foreign Application Priority Data

Dec. 9, 2008 (FR) ..................... 08 58369

(51) Int. Cl.
*H04J 3/06* (2006.01)
*H04B 1/00* (2006.01)
*H04B 10/00* (2013.01)

(52) U.S. Cl.
CPC ............. *H04J 3/0679* (2013.01); *H04J 3/0641* (2013.01); *H04J 3/0667* (2013.01)
USPC ........... 370/350; 370/507; 370/509; 375/145; 375/149; 398/154; 398/155

(58) Field of Classification Search
CPC .................. H04J 3/06–3/0697; H04L 7/0012; H04L 7/0091; H04L 7/033; H04L 7/10
USPC ............. 370/350, 507–520, 395.62; 375/145, 375/149; 398/154, 155
See application file for complete search history.

(56) References Cited

U.S. PATENT DOCUMENTS

| | | | | |
|---|---|---|---|---|
| 5,594,739 | A | * | 1/1997 | Lemieux ........................ 370/350 |
| 6,665,316 | B1 | * | 12/2003 | Eidson .......................... 370/509 |
| 2006/0067367 | A1 | | 3/2006 | Cho et al. |
| 2008/0159270 | A1 | * | 7/2008 | Burke et al. ................... 370/352 |
| 2009/0016475 | A1 | * | 1/2009 | Rischar et al. ................. 375/356 |

OTHER PUBLICATIONS

Silvana Rodrigues Ed, IEEE-1588 and Synchronous Ethernet in Telecom, Information Sciences and Systems, 2007. 41st Annual Conf., Oct. 1, 2007, pp. 138-142.

* cited by examiner

*Primary Examiner* — Un C Cho
*Assistant Examiner* — Jeremy Costin
(74) *Attorney, Agent, or Firm* — Carmen Patti Law Group, LLC (57) ABSTRACT

A method for synchronizing a plurality of clocks arranged within a plurality of nodes of a packet-switching network comprises comparing parameters that relate to the plurality of clocks in order to determine master-slave relationships between the plurality of clocks, and exchanging time-stamped messages over the packet-switching network each time between a master clock and an associated slave clock to make the associated slave clock subservient to the master clock. A node of the packet-switching network comprises a frequency source controlled by a synchronous physical layer technology. The parameters that relate to a clock of the node comprise a parameter that relates to the frequency source to determine the master slave relationships based on one property of the frequency source.

20 Claims, 4 Drawing Sheets

FIG_5

CLOCK FOR A NODE OF A PACKET-SWITCHED NETWORK, AND ASSOCIATED SYNCHRONISATION METHOD

TECHNICAL FIELD

The invention relates to the domain of clock synchronisation in packet-switching networks.

BACKGROUND

For various applications with demanding synchronisation constraints, for example the synchronisation of base stations of a mobile network, methods for the distribution of a reference time and/or a reference frequency on the packet-switching networks are being developed. For example, a Network Time Protocol (NTP) work group of the IETF is developing an upgrade to the NTP protocol initially specified in RFC 1305. The Precision Time Protocol (PTP) of the IEEE has recently been revised with this in mind. The ITU-T has defined a physical layer technology for the distribution of a reference frequency on an Ethernet network, called Synchronous Ethernet and described in the specifications G.8261, G.8262 and G.8264.

The document "IEEE-1588 and Synchronous Ethernet in Telecom", in "2007 International IEEE Symposium on Precision clock Synchronization for Measurement, Control and Communication" pp 138-142 describes a network with a core network in which the synchronisation is distributed by Synchronous Ethernet to a network edge and an access network in which the IEEE-1588 Version 2 protocol is used to prolong the synchronisation chain from the network edge to access devices. At the edge, a type 1588 master clock retrieves the frequency distributed by the Synchronous Ethernet core network.

SUMMARY

One aim of the invention is to improve the distribution of the synchronisation over a packet-switching network.

To do this, the invention provides a method of synchronising a plurality of clocks arranged in a plurality of nodes of a packet-switching network, said method comprising the steps consisting in:

comparing parameters relating to said clocks in order to determine master-slave type relationships between said clocks, exchanging time-stamped messages over the packet-switching network each time between a master clock and an associated slave clock in order to make the slave clock subservient to the master clock, in which at least one node of said packet-switching network comprises at least one frequency source controlled by a synchronous physical layer technology, said parameters relating to one or each clock arranged in said at least one node comprising a parameter relating to said frequency source, so as to determine said master-slave type relationships based on one or more properties of said at least one frequency source controlled by a synchronous physical layer technology.

Various properties of the frequency source(s), including the mere presence of such sources, may therefore be taken into account in the determination of the master-slave type relationships between the clocks. In one embodiment, the simple inclusion of the presence or availability of a synchronised frequency source by the physical layer in one node, and its absence or unavailability in another node, may improve the construction of a distribution chain for the synchronisation over the packet network. In fact, the use of a synchronous physical layer may produce a reference frequency of higher quality than that which can be obtained by distribution of the frequency over the packet network. Other embodiments take into account other properties, for example relating to the quality of the frequency source. A parameter relating to the frequency source may consist of any form of information able to indicate such properties, including a logic indicator, a variable of any type or a structured object.

According to one specific embodiment, the parameter relating to the frequency source comprises a frequency source quality descriptor, corresponding for example to a quantified frequency deviation of the frequency source and/or to quantified frequency stability of the frequency source.

Advantageously, said parameter relating to said frequency source comprises or corresponds to a clock level standardised by the ITU-T, for example in the recommendations G.811, G.812 and G.813; for example selected in the group comprising the PRC level specified by the recommendation G.811, the levels Type I, Type II and Type III specified by the recommendation G.812 and the levels Option I and Option II specified by the recommendation G.813. The use of such a parameter is a simple way to take into account standardised and precise specifications relating to the quality of the frequency sources, in particular their accuracy and their long-term stability.

According to one specific embodiment, the synchronous physical layer technology is Synchronous Ethernet. Other synchronous physical layer technologies may be used in a similar manner, for example SONET/SDH.

According to specific embodiments, time-stamped messages may be exchanged in accordance with a Network Time Protocol, in other words compliant with the recommendations of RFC 1305 of the IETF, or a Precision Time Protocol, in other words compliant with an IEEE 1588 version 2 specification, or subsequent updates to these protocols.

According to one specific embodiment, the parameters relating to the clocks are compared by pairs of clocks, with the parameters relating to a first clock being compared to the corresponding parameters relating to a second clock according to an order of precedence of the parameters, such that in the event of equality of the corresponding parameter(s) greater than said parameter relating to said frequency source in the order of precedence of the parameters, the one for said first and second clocks for which the parameter indicates the presence or the availability of a frequency source controlled by a synchronous physical layer technology is considered greater than the one for which the parameter or the absence of a parameter indicates the absence or unavailability of a frequency source controlled by a synchronous physical layer technology; and/or the one for said first and second clocks for which the parameter indicates a frequency source of a higher quality is considered greater than the one for which the parameter indicates a frequency source of lower quality.

Such a method may be implemented by adapting the Best Master Clock Algorithm defined by the IEEE. However, other methods may be used to hierarchise the clocks, in a centralised or distributed manner, for example the calculation of an overall score for each clock and the hierarchisation based on this overall score.

The invention also provides a clock for a packed-switched network node comprising:

a synchronisation management module able to receive on the packet-switching network sets of parameters respectively relating to external clocks arranged in other nodes of said network, to compare said sets of parameters in order to select a master clock from among said external clocks, and to exchange time-stamped messages on the packet-switching network with said master clock in order to make said clock subservient to said master clock, in which the set of parameters relating to at least one so-called external clock comprises a parameter relating to a frequency source controlled by a synchronous physical layer technology and colocated with said external clock, said synchronisation management module being able to select said master clock based on said parameter or each parameter relating to a frequency source controlled by a synchronous physical layer technology.

The invention also provides a clock for a packed-switched network node comprising:

a synchronisation management module able to send a set of parameters relating to said clock on the packet-switching network to an external clock arranged in another node of said network, in which said set of parameters comprises a parameter relating to a frequency source controlled by a synchronous physical layer technology and arranged in said node.

Such a set of parameters can be configured in various ways, for example statically through a network management system. Preferably, automatic means of configuration are implemented in the node to automatically and dynamically configure the set of parameters, or at least the parameter relating to the frequency source, for example using data of the synchronous physical layer protocol. To do this, according to one embodiment, the clock also comprises a configuration module able to detect one or more properties of said frequency source controlled by a synchronous physical layer technology and arranged in said node and to configure said parameter relating to the frequency source based on the properties detected. For example, the properties detected and taken into account include the presence and/or the availability and/or the quality.

According to a preferred embodiment, the configuration module is able to detect a clock level standardised by the ITU-T attributed to said frequency source.

An idea behind the invention is to construct a synchronisation hierarchy between clocks of a packet-switching network, for example clocks implementing a Precision Time Protocol, taking into account the support which can be provided to at least some of said clocks by the presence of a synchronous physical layer in at least some nodes of the network. This idea may be applied to time clocks, in other words to a distribution hierarchy of a reference time in the packet-switching network and/or to frequency clocks, in other words to a distribution hierarchy of a reference frequency in the packet-switching network. Synchronisation hierarchy is understood to mean at least two clocks associated by a master-slave type relationship.

DESCRIPTION OF THE DRAWINGS

The invention will be better understood, and other purposes, details, characteristics, and advantages thereof will become more clearly apparent upon examining the following description of multiple particular embodiments of the invention, which are given only by way of illustrative and non-limiting examples, with reference to the attached drawings. In these drawings.

DETAILED DESCRIPTION

Figure 1:
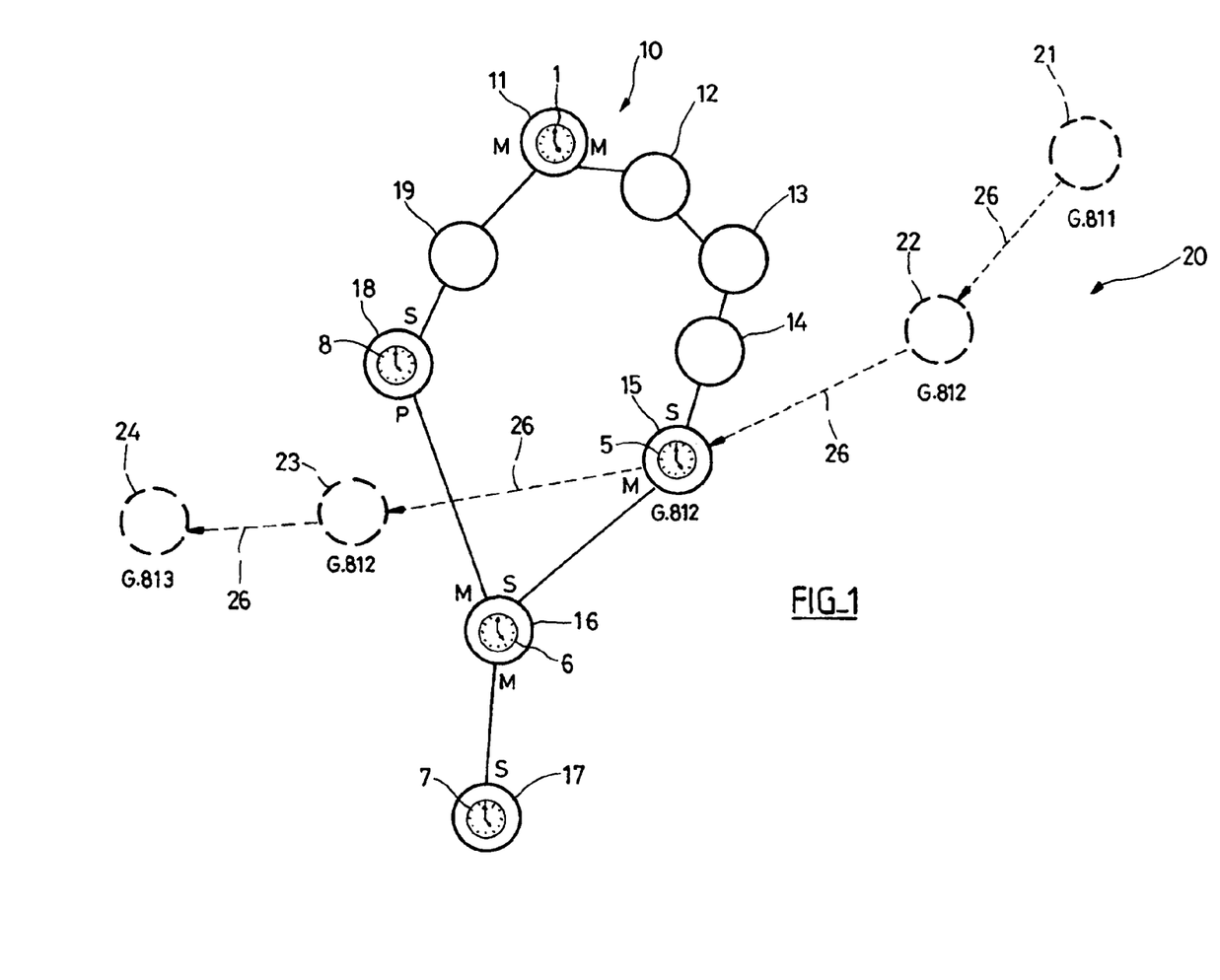
FIG. 1 is a functional schematic representation of a network wherein embodiments of the invention may be implemented.

In reference to FIG. 1, a packet-switching network 10 comprises a plurality of nodes 11 to 19 connected by links shown in a solid line. The topology of the network and the number of nodes and links are purely illustrative. Certain nodes of the network, namely nodes 11, 15, 16, 17 and 18 comprise clocks which need to be synchronised. To do this, the nodes implement a synchronisation protocol used to synchronise frequency and/or time of the clocks. The synchronisation of the frequency means the pooling of a reference frequency. The synchronisation of the time means the pooling of a reference phase. Below, the case is described of time clocks which need to be time synchronised, shown symbolically as hand clocks at the digits 1, 5, 6, 7 and 8 on FIG. 1.

The synchronisation protocol on the network 10 works as follows. A hierarchical distribution chain for the synchronisation is determined in order to make the clocks subservient to one of them serving as a common reference. Preferably, this hierarchical chain is determined taking into account the intrinsic quality of each clock and/or the quality of any external reference sources to which the clocks have access, for example GPS type satellite system, atomic clock, synchronous physical layer, etc. Therefore, taking into account these properties of the clocks and their respective positions in the network, the hierarchical chain is determined in such a way as to limit the inaccuracies and errors accumulated at the end of the chain. This hierarchical chain is embodied through mutual subservience relationships between the clocks. The clocks are synchronised through the exchanging of time-stamped messages each time between a master clock and its slave clock(s). A clock located at an intermediate level of the chain is therefore both a slave to a first clock and master to at least a second clock.

In the embodiment illustrated in FIG. 1, at least one node of the network 10, namely node 15 in this case, also comprises a frequency source controlled by a synchronous physical layer technology. This synchronous physical layer technology, for example the Synchronous Ethernet technology, is implemented jointly with a set of network elements 21 to 24, shown in dashed lines, which thus constitute a synchronous physical network 20. The synchronous physical network 20 is used to distribute a reference frequency which meets strict accuracy constraints, since the physical layer generates the clock signal directly from the binary flow and independently of the network load. At node 15, the time clock 5 calculates the reference time through a method which exploits the frequency source controlled by the synchronous physical layer. The accuracy of the frequency source controlled by the synchronous physical layer therefore positively influences the accuracy of the time clock colocated in node 15.

One possible method to determine the hierarchical distribution chain for the synchronisation on the network 10 involves comparing descriptor parameters of the clocks 1, 5, 6, 7 and 8, in order to assign the function of master each time to the best possible clock, also taking into account the network topology. Examples of descriptor parameters which can be used in such a method are given in the first column of table 1. The other columns give the values of these parameters for clocks 1, 5, 6, 7 and 8 based on an illustrative example. The "priority" and "class" parameters are used for example as in the PTP protocol. The "quality level" parameter serves to reflect the quality of a frequency source controlled by the synchronous physical layer and colocated with the clock, if one exists. A specific value, here an empty value, is used to designate the absence of such a frequency source. In the embodiment corresponding to table 1, the permissible values of the "quality level" parameter are clock levels standardised by the ITU-T. In FIG. 1, the clock level attributed to each network element of the synchronous physical network 20 is written beneath the network element.

TABLE 1 descriptor parameters of the clocks of FIG. 1

| Parameter name | Clock 1 | Clock 5 | Clock 8 | Clock 6 | Clock 7 |
|---|---|---|---|---|---|
| Priority | 1 | 1 | 1 | 1 | 10 |
| Class | 6 | 248 | 248 | 248 | 255 |
| Quality level | | G.812 (type I) | | | |

Table 2 describes examples of clock levels standardised by the ITU-T and the associated quantitative specifications. The levels are classified from the highest to the lowest quality level.

Figure 3:
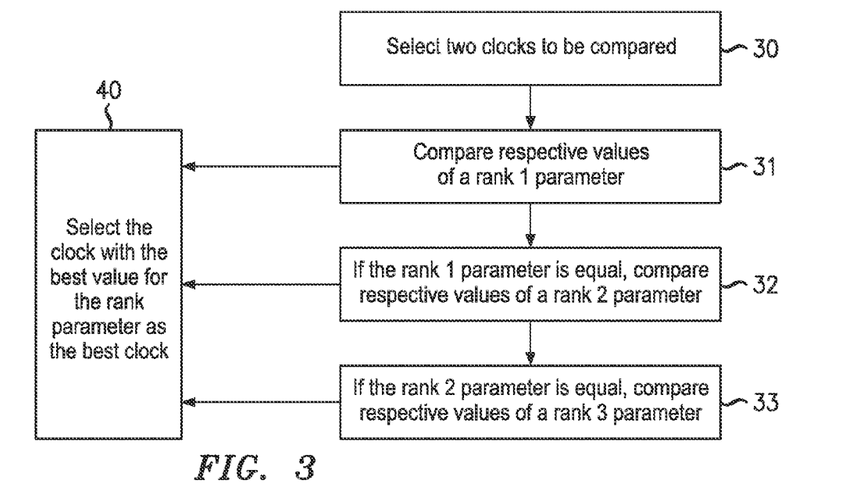
FIG. 3 is a representation of a method of comparing parameters relating to clocks, which can be implemented by the node of FIG. 2.

FIG. 3 represents an embodiment of a method to compare the descriptor parameters of the clocks based on a given order of precedence. In step 30, two clocks to be compared are selected. In step 31, the respective values of a rank 1 parameter, for example "priority", are compared. The clock with the best value for the rank 1 parameter is selected as the best clock and the method ends at step 40. If the rank 1 parameter is equal in step 32, the respective values of a rank 2 parameter, for example "class", are compared. The clock with the best value for the rank 2 parameter is selected as the best clock and the method ends at step 40. If the rank 2 parameter is equal in step 33, the respective values of a rank 3 parameter, for example "quality level", are compared, and so on. By convention, an empty value for the "quality level" parameter is considered the lowest value for comparisons.

Applied to the parameters of table 2, this algorithm produces in particular the following results: clock 1 is considered better than all the others and is therefore selected as the common reference. It is therefore selected as master of clocks 8 and 5. Clock 5 is considered better than clock 8 and is therefore selected as master of clock 6. Clock 6 is selected as master of clock 7. In FIG. 1, the letters M, S and P placed at the ports of the nodes designate the subservience relationships thus obtained. M designates a master port, S a corresponding slave port and P a passive port.

The comparison of the clocks to determine the hierarchical chain can be carried out in a centralised manner, for example by a network management system, not shown. Preferably, this comparison is carried out in a distributed manner in the clocks themselves, in accordance with the principles set out in the PTP protocol (best master clock algorithm).

In the latter case, each clock sends its own set of descriptor parameters to the neighbouring clocks in signalling messages. On receiving such a signalling message, a clock compares its descriptor parameters with those of the external clock which sent the message to determine which one must act as master. If it receives signalling messages from several external clocks liable to act as master, the clock compares the external clocks to select its master. Therefore, in an embodiment corresponding to FIG. 1, clock 6 receives the descriptor parameters of clocks 5 and 8 and determines that clock 5 must act as master. The synchronisation is therefore distributed from clock 1 to clocks 5 and 8 and from clock 5 to clock 6, but not from clock 8 to clock 6.

Therefore, the "quality level" parameter is used to give preference to the clocks which benefit locally from a frequency source controlled by the synchronous physical layer. The clock descriptor parameters in each node may be configured in various ways. In reference to FIG. 2, an embodiment of node 15 is now described which is used to produce this configuration automatically by cooperation with the synchronous physical layer protocol.

Figure 2:
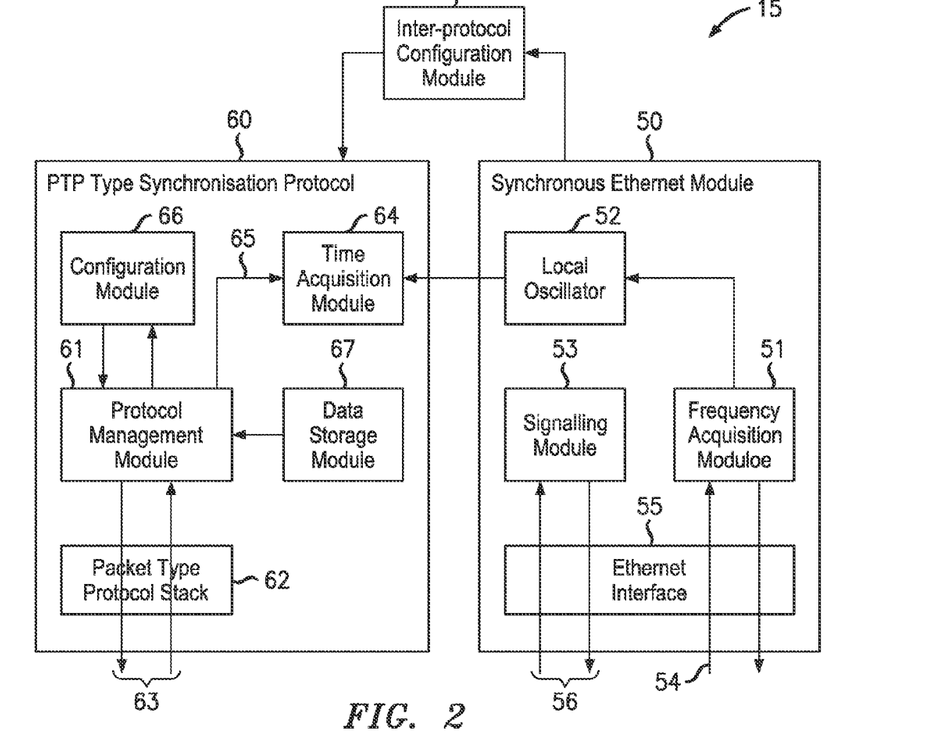
FIG. 2 is a functional schematic representation of a node according to an embodiment of the invention, which can be used in the network of FIG. 1.

FIG. 2 is a functional representation of node 15. Only the components which are helpful to understand the synchronisation have been shown. Two main functional blocks are shown: block 50 corresponds to a synchronous physical layer clock, more specifically a synchronous Ethernet module in the example shown. Block 60 corresponds to a clock implementing a synchronisation protocol on a packet type protocol stack, more specifically a PTP type synchronisation protocol modified in accordance with an embodiment of the invention.

The synchronous Ethernet module 50 is produced in a conventional manner. A frequency acquisition module 51 processes a binary train 54 received through an Ethernet interface 55 so as to retrieve a synchronisation signal at the reference frequency. Using this synchronisation signal, it controls a local oscillator 52 in order to reach a certain quality level. A signalling module 53 manages the synchronous Ethernet signalling, transported in IEEE Slow Protocol type frames (appendix 57 of the specification IEEE 802.3) 56. In particular, the synchronous Ethernet signalling comprises synchronisation status messages (SSM) comprising a quality level field in which the elements of the physical network 20 declare the quality level of their local frequency source. For a given node, this quality level depends both on the hardware quality of the local oscillator, e.g. the oscillator 52 for node 15, and on the quality of the source from which the synchronisation signal is obtained, e.g. the quality of the local frequency source of the upstream network element 22 for node 15. Therefore, each element of the physical network 20 sends its neighbours with a lower hierarchy SSM messages 26 comprising a quality level field. In the example of FIG. 1, this field takes a value G.811 for the element 21, G.812 type I for the elements 22, 15/50 and 23, and G.813 option I for the element 24. The other elements of the physical network 20 comprise on each occasion a synchronous Ethernet module produced in the same way as module 50 described in reference to node 15.

The clock 60 comprises a protocol management module 61 which processes the receiving and the sending of messages 63 compliant with the synchronisation protocol through a packet type protocol stack 62, for example a UDP/IP/Ethernet stack or other. For example, in accordance with the PTP protocol, the messages exchanged comprise Sync, Follow_up, Delay_req and Delay_resp type messages bearing time-stamping information. A time acquisition module 64 determines the reference time using both the time-stamped data 65 thus received and the frequency signal generated by the local oscillator 52. In one embodiment, the local oscillator 52 comprises a digital frequency synthesiser. In accordance with the PTP protocol, the messages exchanged also comprise Announce type messages through which the clocks communicate their descriptor parameters. A configuration module for the ports 66 compares these descriptor parameters, for example according to the best master clock algorithm, to determine the status of each port of the node connected to an edge clock. To do this, the protocol management module 61 accesses a set of descriptor parameters specific to the clock 60, comprising for example the parameters of table 1, stored in a data storage module 67.

Although they have been shown separately, the packet type protocol stack 62 and the Ethernet interface 65 are not necessarily completely detached. In other words the protocol stack 62 may comprise an Ethernet layer. Furthermore, the synchronous physical layer protocol and the packet transport protocol may cohabit on the same physical ports and the same links. In FIG. 1, the topology of the synchronous physical network 20 is purely illustrative and non-limiting. In particular, the networks 10 and 20 may have several nodes in common, similar to the node 15, or even be partially or entirely superimposed.

An inter-protocol configuration module 70 is responsible for automatically and dynamically fixing the value of the "quality level" parameter of clock 60 based on the properties of the physical layer clock 50 of the node. According to one embodiment, the inter-protocol configuration module 70 detects the presence or the absence of a synchronous physical layer in the node and fixes the value of the "quality level" parameter of clock 60 based on this detection. For example, if the synchronous physical layer is present, the module 70 accesses the quality level declared by the signalling module 53 and fixes the value of the "quality level" parameter of the clock 60 based on this field. In this way, the clock 60 is able to communicate a set of descriptor parameters which reflect the quality of its local frequency source controlled by the physical layer.

The other clocks of the nodes of network 10 may be produced in a similar manner to clock 60 described in reference to node 15. However, if there is no physical layer present in the node, the time acquisition module 64 is supplied by another frequency reference, the quality of which is not necessarily guaranteed. The clock comparison method is preferably implemented in the same way in all the clocks.

In one embodiment, the synchronous physical layer comprises detection and notification functions of the synchronisation errors, in order to allow the dynamic reconfiguration of the physical network based on the errors detected. Such functions are in particular available with the synchronous Ethernet protocols and SONET/SDH. Thanks to the inter-protocol configuration module 70, it is possible to extend these dynamic reconfiguration functions to the time distribution chain on the network 10. This point will now be illustrated with reference to FIGS. 4 and 5.

Figure 4:
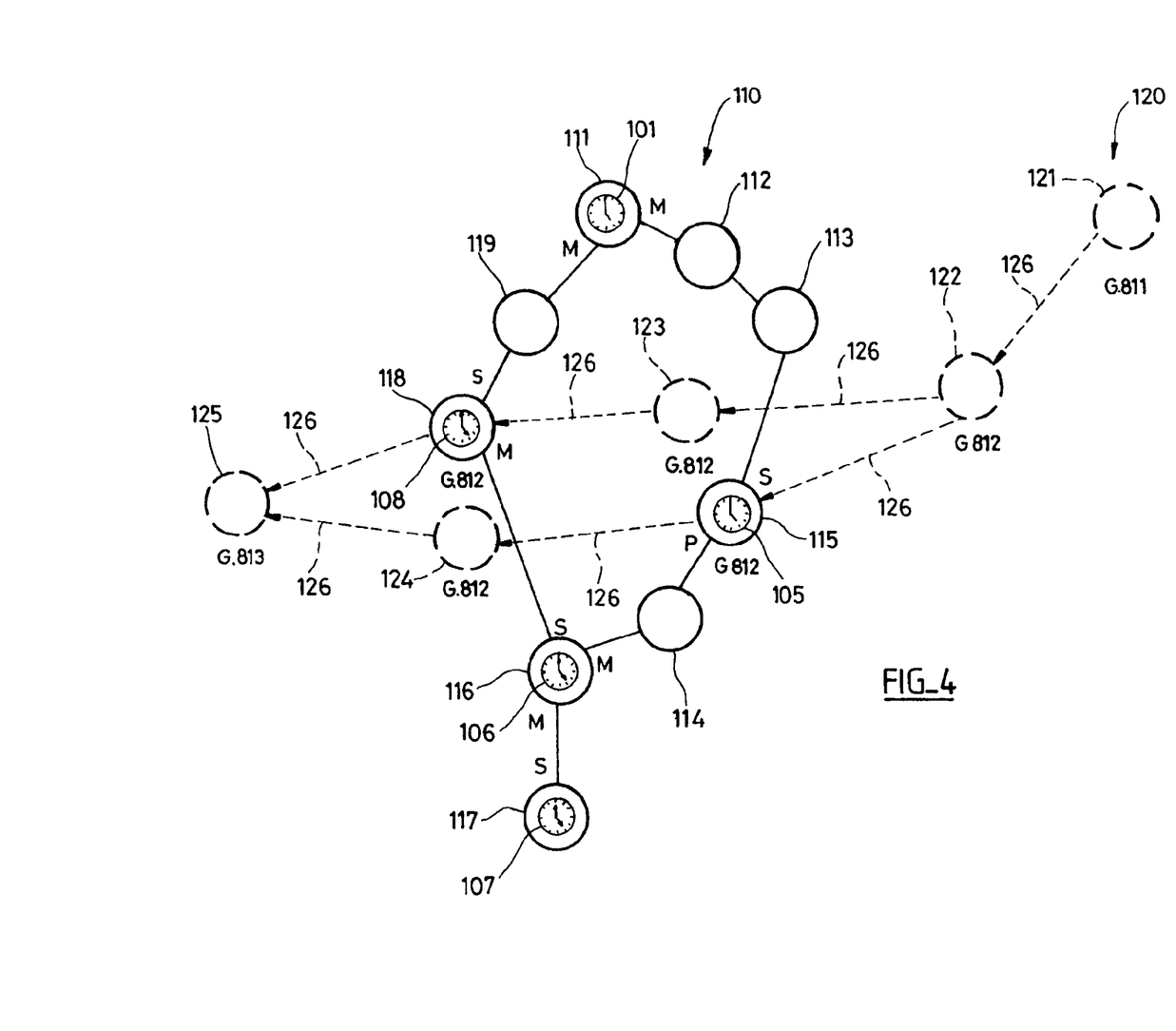
FIGS. 4 and 5 are functional schematic representations of another network wherein embodiments of the invention may be implemented.

In FIG. 4, the elements identical or similar to those in FIG. 1 bear the same reference number increased by 100. Here we consider a packet-switching network 110 for which two nodes 115 and 118 comprise both a PTP type time clock and a synchronous Ethernet physical clock. The nodes 115 and 118 are produced similarly to node 15 described previously. The physical clocks in the two nodes are initially assumed to be of the same quality, for example G.812 type I. Table 3 summarises the descriptor parameters of the PTP clocks of FIG. 4.

Clock 106 of node 116 implements the best master clock algorithm to select a master clock. Due to the equal values of the descriptor parameters announced by clocks 105 and 108, the algorithm selects the one which presents the shortest distribution path to the common reference 101, therefore clock 108. As indicated by the statuses of the ports in FIG. 4, the time synchronisation is therefore distributed on network 110 from clock 101 to clocks 105 and 108, from clock 108 to clock 106 and from clock 106 to clock 107. The nodes 112, 113, 114 and 119 here represent transparent clocks of the PTP protocol.

Figure 5:
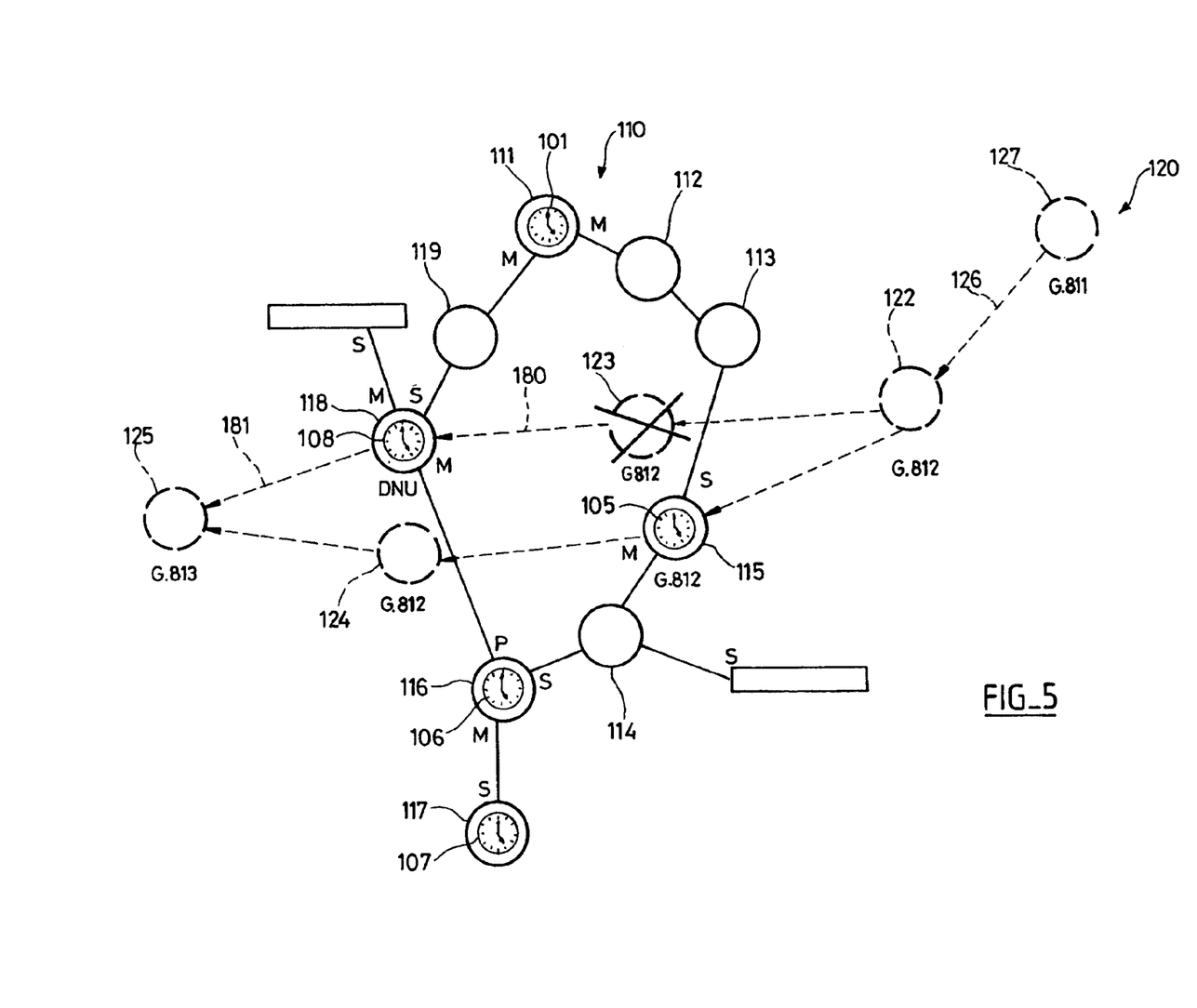

In FIG. 5, it is assumed that a failure has occurred on the network element 123 of the synchronous Ethernet network 120. As a result, the network element 123 has sent node 118, after a certain timeout, a synchronisation status message 180 to declare a quality level reflecting the unavailability status of the local clock, i.e. a reserved "Do Not Use" value in the synchronous Ethernet protocol. As a result, the physical clock 50 of node 118 detects that it is no longer synchronised by a reliable reference and declares itself in turn, after a configurable timeout, unavailable in a synchronisation status message 181.

As a result, the inter-protocol configuration module 70 of node 118 modifies the "quality level" parameter of clock 108 to reflect the unavailability of the frequency source controlled by the synchronous Ethernet layer. For example, as indicated in table 4, the new value is empty, i.e. equivalent to the absence of a frequency source controlled by the synchronous Ethernet layer. According to another variant, it is possible to introduce a specific value of the "quality level" parameter, for example a DNU value, to distinguish cases of unavailability from cases of absence. In this variant, the DNU value is considered to be greater than the empty value for the clock comparison.

Several methods may be used to match the values of the quality level field carried in the synchronous Ethernet signalling with the corresponding values of the "quality level" parameter carried in the synchronisation protocol on the packet network, e.g. the PTP protocol. A simple method which can be implemented by the inter-protocol configuration module 70 involves using identical values in the quality level field of the synchronous Ethernet protocol and in the "quality level" parameter carried in the synchronisation protocol on the packet network. However, the use of different values compliant with a given correspondence table can also be envisaged, for example to respect constraints relating to different numbers of bits available in the two protocols.

After receiving an Announce type message comprising the new set of parameters of clock 108, clock 106 repeats the comparison of clocks 108 and 105, which leads this time to clock 105 being selected as master, as indicated by the statuses of the ports in FIG. 5. Therefore, a dynamic reconfiguration of the time distribution chain is obtained based on the status of the physical clocks in the network.

Similar results can be obtained with other synchronous physical layer protocols, for example SONET/SDH and other time distribution protocols on packet-switching networks, for example NTP.

According to one embodiment in which the nodes of the packet network use the NTP protocol, a part of the Stratum field of the NTP header can be used to carry the "quality level" parameter. In fact, the 8 bits of this field seem sufficient to encode both the Stratum parameter as intended in the standard, for example over 4 bits, and the "quality level" parameter representing the quality of the colocated frequency source controlled by the synchronous physical layer, for example over 4 bits. Another variant involves carrying the value of the "quality level" parameter in an NTP TLV field, which leaves greater flexibility with regard to the quantity of information which can be included in this parameter.

Some of the elements shown, particularly the various modules, may be constructed in various forms, in a stand-alone or distributed fashion, using hardware and/or software components. Hardware components that may be used are application-specific integrated circuits, field-programmable gate arrays, or microprocessors. Software components may be written in various programming languages, such as C, C++, Java, or VHDL. This list is not exhaustive.

A network management system may be a hardware device, such as a microcomputer, a workstation, a device connected to the Internet, or any other dedicated or general-purpose communication device. Software programs run by this system fulfil network management functions for controlling network elements.

Although the invention has been described in connection with multiple specific embodiments, it is naturally not in any way limited to them, and comprises all technical equivalents of the means described, as well as their combinations, if said combinations fall within the scope of the invention.

The use of the verb "comprise" or "include" and their conjugated forms does not exclude the presence of elements or steps other than those set forth in a claim. The use of the indefinite article "a" or "an" for an element or step does not, unless otherwise stated, excluded the presence of a plurality of such elements or steps. Multiple means or modules may be depicted by a single hardware element.

In the claims, any reference sign within parentheses should not be interpreted as limiting the claim.

TABLE 2 clock levels standardised by the ITU-T

| Clock level | Accuracy in free mode | Stability | Clamping range | Deviation mask |
|---|---|---|---|---|
| PRC (G.811) | $+/-1 \times 10^{-11}$ | N/A | N/A | N/A |
| Type II (G.812) | +/−0.016 ppm | $+/-1 \times 10^{-10}$/day | 0.016 ppm | 0.001 Hz |
| Type I (G.812) | N/D | $+/-2.7 \times 10^{-9}$/day | 0.01 ppm | 0.003 Hz |
| Type III (G.812) | +/−4.6 ppm | $+/-1.2 \times 10^{-8}$/day | 4.6 ppm | 0.001 Hz |
| Type IV (G.812) | +/−4.6 ppm | $+/-3.9 \times 10^{-7}$/day | 4.6 ppm | 3 Hz 0.1 Hz (SONET) |
| Option I (G.813) | +/−4.6 ppm | $+/-2 \times 10^{-6}$/day | 4.6 ppm | 1-10 Hz |
| Option 2 (G.813) | +/−20 ppm | $+/-4.6 \times 10^{-6}$/day | 20 ppm | 0.1 Hz |
| 4 | +/−32 ppm | N/A | 32 ppm | No |

TABLE 3 descriptor parameters of the PTP clocks of FIG. 4

| Parameter name | Clock 101 | Clock 105 | Clock 108 | Clock 106 | Clock 107 |
|---|---|---|---|---|---|
| Priority | 1 | 1 | 1 | 1 | 10 |
| Class | 6 | 248 | 248 | 248 | 255 |
| Quality level | | G.812 (type I) | G.812 (type I) | | |

TABLE 4 descriptor parameters of the PTP clocks of FIG. 5

| Parameter name | Clock 101 | Clock 105 | Clock 108 | Clock 106 | Clock 107 |
|---|---|---|---|---|---|
| Priority | 1 | 1 | 1 | 1 | 10 |
| Class | 6 | 248 | 248 | 248 | 255 |
| Quality level | | G.812 (type I) | | | |

The invention claimed is:

1. A method of synchronising a plurality of clocks arranged in a plurality of nodes of a packet-switching network, said method comprising the steps of:

comparing parameters that relate to said plurality of clocks to determine master-slave type relationships between said plurality of clocks, said parameters comprising a priority parameter, a class parameter, and a quality level parameter that has permissible values based on standardized clock levels; and exchanging time-stamped messages over said packet-switching network each time between a master clock and an associated slave clock to make said associated slave clock subservient to said master clock;

wherein at least one node of said packet-switching network comprises at least one frequency source controlled by a synchronous physical layer technology used to distribute a reference frequency, and wherein a presence or an absence of said synchronous physical layer technology is detectable by said at least one node, and wherein a value of said quality level parameter is fixed in said at least one node based on said detection, said parameters that relate to said master clock being arranged in said at least one node comprising said quality level parameter that relates to said at least one frequency source to determine said master-slave type relationships based on a property of said at least one frequency source; and wherein said master-slave type relationships of said plurality of clocks are determined via a comparison of said parameters that relate to said plurality of clocks, with a first comparison being based on said parameters that relate to a first clock of said plurality of clocks and corresponding parameters that relate to a second clock of said plurality of clocks according to an order of precedence of said parameters, and subsequent comparisons being based on an outcome of the first comparison and other corresponding parameters that relate to other clocks of said plurality of clocks according to the order of precedence of said parameters;

wherein after a determination of equality of said corresponding parameters greater than said quality level parameter that relates to said at least one frequency source in said order of precedence of said parameters, a clock for which said quality level parameter indicates the presence or an availability of said at least one frequency source controlled by said synchronous physical layer technology is considered greater than another clock for which said quality level parameter or an absence of said quality level parameter indicates the absence or unavailability of said at least one frequency source, and a clock for which said compared parameters indicates a frequency source of a higher quality is considered greater than other clocks for which said compared parameters indicates a frequency source of a lower quality.

2. The method according to claim 1, wherein said quality level parameter that relates to said frequency source comprises a quality descriptor of said frequency source.

3. The method according to claim 2, wherein said quality descriptor of said frequency source corresponds to a quantified frequency deviation of said frequency source.

4. The method according to claim 2, wherein said quality descriptor of said frequency source corresponds to a quantified frequency stability of said frequency source.

5. The method according to claim 1, wherein said synchronous physical layer technology comprises Synchronous Ethernet technology.

6. The method according claim 1, wherein the time stamped messages are exchanged in accordance with a Network Time Protocol.

7. The method according to claim 1, wherein the time stamped messages are exchanged in accordance with a Precision Time Protocol.

8. The method according to claim 1, further comprising the step of performing the comparison within said plurality of clocks.

9. The method according to claim 1, wherein said synchronous physical layer technology comprises a Synchronous Optical Network or a Synchronous Digital Hierarchy (SONET or SDH).

10. The method according to claim 1, wherein the priority parameter and the class parameter are used as in a Precision Time Protocol.

11. The method according to claim 1, wherein the value of said quality level parameter is modified in said at least one node when said frequency source is unavailable.

12. A clock for a node of a packet-switching network comprising: a synchronisation management module configured to receive on the packet-switching network sets of parameters respectively that relate to external clocks arranged in other nodes of the packet-switching network, to compare said sets of parameters to select a master clock from among said external clocks, and to exchange time-stamped messages on the packet-switching network with said master clock to make said clock subservient to said master clock, said parameters comprising a priority parameter, a class parameter, and a quality level parameter that has permissible values based on standardized clock levels; and
    a configuration module configured to detect a presence or an absence of a synchronous physical layer technology in the node and to fix a value of a quality level parameter of the clock based on the detection;
  wherein the set of parameters that relate to at least one external clock comprise said quality level parameter that relates to a frequency source controlled by the synchronous physical layer technology used to distribute a reference frequency, and colocated with said at least one external clock, said synchronisation management module being able to select said master clock based on said quality level parameter that relates to the frequency source; and
  wherein the master clock and the subservient clock are determined via a comparison of said parameters that relate to said clock and said external clocks, with a first comparison being based on said parameters that relate to said clock and corresponding parameters that relate to a second clock of said external clocks according to an order of precedence of said parameters, and subsequent comparisons being based on an outcome of the first comparison and other corresponding parameters that relate to other clocks of said external clocks according to the order of precedence of said parameters;
  wherein after a determination of equality of said corresponding parameters greater than said quality level parameter that relates to said frequency source in said order of precedence of said parameters, one clock of the node and the other nodes for which said quality level parameter indicates the presence or an availability of said frequency source controlled by said synchronous physical layer technology is considered greater than another clock for which said quality level parameter or an absence of said quality level parameter indicates the absence or unavailability of said frequency source, and clocks of the node and the other nodes for which said compared parameters indicates a frequency source of a higher quality is considered greater than other clocks for which said compared parameters indicates a frequency source of a lower quality.

13. A clock for a node of a packet-switching network comprising: a synchronisation management module configured to send on the packet-switching network a set of parameters that relate to said clock intended for an external clock arranged in another node of the packet-switching network, and to exchange time-stamped messages on the packet-switching network with said external clock to make a slave clock selected from among said clock and said external clock subservient to a master clock selected from among said clock and said external clock, said parameters comprising a priority parameter, a class parameter, and a quality level parameter that has permissible values based on standardized clock levels; and
    a configuration module configured to detect a presence or an absence of a synchronous physical layer technology in the node and to fix a value of a quality level parameter of the clock based on the detection;
  wherein said set of parameters comprise said quality level parameter that relates to a frequency source controlled by the synchronous physical layer technology used to distribute a reference frequency and arranged in said node; and
  wherein the master clock and the subservient clock are determined via a comparison of said parameters that relate to said clock and said external clock, with a first comparison being based on said parameters that relate to said clock and corresponding parameters that relate to said external clock according to an order of precedence of said parameters, and subsequent comparisons being based on an outcome of the first comparison and other corresponding parameters that relate to other external clocks according to the order of precedence of said parameters;
  wherein after a determination of equality of said corresponding parameters greater than said quality level parameter that relates to said frequency source in said order of precedence of said parameters, one clock for which said quality level parameter indicates the presence or an availability of said frequency source controlled by said synchronous physical layer technology is considered greater than another clock for which said quality level parameter or an absence of said quality level parameter indicates the absence or unavailability of said frequency source, and said clock of the node and said external clock for which said compared parameters indicates a frequency source of a higher quality is considered greater than clocks for which said compared parameters indicates a frequency source of a lower quality.

14. The clock according to claim 13, wherein the configuration module is configured to detect one or more properties of said frequency source and arranged in said node, and to configure said quality level parameter that relates to said frequency source based on the one or more properties detected.

15. The clock according to claim 14, wherein the configuration module is configured to detect a standardized clock level attributed to said frequency source.

16. The clock according to claim 14, wherein the configuration module is configured to detect an unavailability status of said frequency source.

17. The clock according to claim 13, wherein said synchronous physical layer technology comprises Synchronous Ethernet technology.

18. The clock according to claim 13, wherein the time stamped messages are exchanged in accordance with a Network Time Protocol.

19. The clock according to claim 13, wherein the time stamped messages are exchanged in accordance with a Precision Time Protocol.

20. The clock according to claim 13, wherein said synchronous physical layer technology comprises a Synchronous Optical Network or a Synchronous Digital Hierarchy (SONET or SDH).

* * * * *